United States Patent
Platise

(10) Patent No.: US 10,424,910 B2
(45) Date of Patent: Sep. 24, 2019

(54) PROTECTIVE DEVICE AND PROTECTIVE SYSTEM FOR ELECTRICAL CIRCUITS, AND METHOD FOR CONTROLLING THE PROTECTIVE SYSTEM

(71) Applicant: ENERGIJSKI KONDUKTORJI D.O.O., Logatec (SI)

(72) Inventor: Uros Platise, Kranj (SI)

(73) Assignee: ENERGIJSKI KONDUKTORJI D.O.O., Logatec (SI)

( * ) Notice: Subject to any disclaimer, the term of this patent is extended or adjusted under 35 U.S.C. 154(b) by 250 days.

(21) Appl. No.: 15/286,904

(22) Filed: Oct. 6, 2016

(65) Prior Publication Data
US 2017/0025845 A1    Jan. 26, 2017

Related U.S. Application Data

(63) Continuation of application No. PCT/EP2015/000621, filed on Mar. 21, 2015.

(51) Int. Cl.
H02H 3/093    (2006.01)
H02H 3/06    (2006.01)
H02H 7/26    (2006.01)

(52) U.S. Cl.
CPC ........... *H02H 3/093* (2013.01); *H02H 3/066* (2013.01); *H02H 7/263* (2013.01)

(58) Field of Classification Search
CPC ......... H02H 3/093; H02H 3/066; H02H 7/263
See application file for complete search history.

(56) References Cited

U.S. PATENT DOCUMENTS

| 5,305,174 A * | 4/1994 | Morita | H02H 7/30 |
| | | | 361/58 |
| 6,195,243 B1 * | 2/2001 | Spencer | H02H 3/00 |
| | | | 361/64 |
| 2008/0082276 A1 | 4/2008 | Rivers et al. | |

(Continued)

FOREIGN PATENT DOCUMENTS

| DE | 10 2007 009 552 A1 | 8/2008 |
| DE | 10 2009 011 757 A1 | 9/2010 |
| EP | 0 474 186 A2 | 3/1992 |

(Continued)

OTHER PUBLICATIONS

International Search Report issued for corresponding International Patent Application No. PCT/EP2015/000621 dated May 26, 2015.

*Primary Examiner* — Scott Bauer
(74) *Attorney, Agent, or Firm* — Myers Wolin, LLC

(57) ABSTRACT

A protective device is provided comprising a microswitch which is serially connected to a fuse or a circuit breaker, a current measuring unit, a storage unit, and a control unit. At least one current value range is stored on the storage unit. The current measuring unit is designed to measure current intensities in the protective device and to generate current values which represent the measured current intensities. The control unit is designed to process the current values, to open the microswitch if a current value lies in the current value range, and to reclose the microswitch after being opened. Also provided is a protective system for electrical circuits with multiple protective devices of the aforementioned type and to a method for controlling the protective system.

11 Claims, 3 Drawing Sheets

(56) References Cited

U.S. PATENT DOCUMENTS

2013/0060393 A1* 3/2013 Somasundaram ........ H02J 3/14
  700/291
2013/0342011 A1* 12/2013 Robinson ................ G06F 1/263
  307/12

FOREIGN PATENT DOCUMENTS

GB  2 450 426 A  11/2008
WO  2011/103887 A1  9/2011

* cited by examiner

PROTECTIVE DEVICE AND PROTECTIVE SYSTEM FOR ELECTRICAL CIRCUITS, AND METHOD FOR CONTROLLING THE PROTECTIVE SYSTEM

CROSS REFERENCE TO RELATED APPLICATIONS

This application is a continuation under 35 U.S.C. § 120 of International Application PCT/EP2015/000621, filed Mar. 21, 2015, which claims priority to German Application 10 2014 004 912.4, filed Apr. 7, 2014, the contents of each of which are incorporated by reference herein.

FIELD OF THE INVENTION

The invention relates to a protective device and a protective system for electrical circuits as well as a method for controlling the protective system.

BACKGROUND

Electrical circuits of dwellings, houses or office buildings, for example, with one load or several loads, are typically protected from sustained overcurrents and short-circuit currents by a protective device in the form of a fuse or a circuit breaker. Usually several electrical circuits are then operated in parallel and supplied with electricity from at least one power line, wherein the protective devices are disposed between the electrical circuits and the power line and together form a protective system. After a fuse has been blown or a circuit breaker has been tripped, typically the respective protective devices have to be replaced or reset, which is laborious and causes costs. Furthermore, with conventional fuses and circuit breakers, the power consumption cannot be reproduced or controlled by individual electrical circuits. This is of particular interest precisely in times of rising electricity prices and fluctuating availability of electricity in the power line.

GB 2 450 426 A teaches switching relays, which are connected to fuses or circuit breakers and which can be opened and closed by means of a remote controller in order to open or close electrical circuits. Power-measuring units are able to measure the power consumption in the electrical circuits protected by fuses or circuit breakers and transmit it to the remote controller, so that a user of the remote controller can decide on the basis of the power consumption of the respective electrical circuits whether an electrical circuit should be disconnected or remain closed. The system disclosed by GB 2 450 426 A permits protection of the electrical circuits against sustained overcurrents and short-circuit currents as has been usual heretofore by its fuses or circuit breakers, and so they must still be replaced or reset if they are blown or tripped. The system disclosed by GB 2 450 426 A involves complex equipment, necessitates additional overall space, especially in the region of the fuses or circuit breakers and to only a very limited extent permits control of the protective system comprising several fuses or circuit breakers and of the power consumption in individual electrical circuits.

SUMMARY

The object of the present invention is therefore to provide an improved, particularly safe and convenient protective device as well as a protective system and a method for controlling it, so that the power consumption in electrical circuits can be automatically controlled more effectively.

The object is achieved by a protective device, a protective system, and a method, according to the claims.

The inventive protective device is characterized in that it comprises a microswitch connected in series with a fuse or a circuit breaker, a current-measuring unit, a memory unit and a control unit. At least one current-value range is saved in the memory unit. The current-measuring unit is set up to measure current intensities in the protective device as well as to generate current values representing the measured current intensities. The control unit is set up to process the current values, to open the microswitch when a current value lies within the current-value range and to close the microswitch again after it has been opened.

For this purpose the protective device preferably has an input that can be connected to a current-carrying power line and an output that can be connected to an electrical circuit. The fuse or the circuit breaker and the microswitch are then disposed in series between input and output, in which case, for example, the current-measuring unit is able to measure current intensities between the microswitch and the output and to generate current values representing the measured current intensities.

The at least one current-value range is preferably saved as a data record in the memory unit. Particularly preferably, at least two current-value ranges are saved in the memory unit, namely a sustained overcurrent value range, which defines a sustained overcurrent condition, and a short-circuit current value range, which defines a short-circuit current condition. This memory unit may be integrated in the control unit, for example, or may be formed by a standalone unit.

The control unit is able to access the current values generated by the current-measuring unit and process them. Only adding, subtracting, comparing, saving, deleting or forwarding, for example, fall under processing. Furthermore, the control unit may also be set up particularly advantageously to process any desired values other than current values. In particular, the control unit may be set up to compare the current values generated by the current-measuring unit with the current-value ranges saved in the memory unit. If the control unit determines in such a comparison that the current values lie in a current-value range saved in the memory unit, e.g. in a current-value range defining the sustained overcurrent condition or the short-circuit current condition, it is able to open the microswitch and thereby disconnect the electrical circuit of the protective device from the grid.

Thus the microswitch can be automatically opened by means of the control unit before the fuse would be blown or the circuit breaker tripped. Thus the fuse or circuit breaker now serves merely as a redundant safeguard, in case the microswitch were not to open on time. The need for replacement or resetting after blowing or tripping is eliminated, because the microswitch can be automatically closed again after it has been opened, e.g. after a definable time period or when a further definable criterion is met. The protective device is particularly compact and, for example, may have the same dimensions as standard fuse-type protective devices or circuit breakers, so that these may be replaced without problems by the inventive protective device. In addition, the inventive protective device may have actuating elements, by means of which the microswitch can be manually—without the need to provide a power supply—opened and closed (again), which is of advantage in particular in case of failure of one or more components of the protective device or its power supply.

According to a first embodiment, it is advantageously provided that at least one maximum continuous value assigned to the at least one current-value range is saved in the memory unit and the control unit is set up to open the microswitch when current values are present in the current-value range for longer than the maximum continuous value.

According to this embodiment, at least one pair consisting of a current-value range and a maximum continuous value is saved in the memory unit of the protective device. Preferably at least two pairs of current-value ranges and maximum continuous values associated with one another are saved in the memory unit, namely a sustained overcurrent value range with an assigned sustained overcurrent maximum continuous value, defining the maximum duration for which a sustained overcurrent condition is tolerated, and a short-circuit current value range with an assigned short-circuit current maximum continuous value, defining the maximum duration for which a short-circuit current is tolerated.

The control unit is set up to measure the duration for which current values generated successively by the current-measuring unit lie in the current-value range, to compare the measured duration with that maximum continuous value saved in the memory unit which is assigned to the current-value range in question, and if the maximum continuous value is exceeded to open the microswitch, whereby an electrical circuit connected to the protective device can be separated from the power line without blowing the fuse or tripping the circuit breaker.

According to a further embodiment, the protective device advantageously comprises at least one further measuring unit consisting of a temperature-measuring unit, a voltage-measuring unit, an energy-measuring unit, an impedance-measuring unit, a frequency-measuring unit and a power-measuring unit, wherein at least one further value range corresponding to the type of further measuring unit in question is saved in the memory unit. The further measuring unit is set up to perform measurements corresponding to its type and to generate corresponding measured values. The control unit is set up to process the measured values and to open the microswitch when a measured value lies in the further value range in question.

If the protective device comprises a temperature-measuring unit, at least one temperature-value range, preferably an overtemperature-value range, is therefore saved in the memory unit, to define the overtemperature measured values that are not tolerated. Since fuses or power circuit breakers typically have a bimetallic element or a thin wire, which overheats and/or blows during sustained overcurrents, the temperature-measuring unit will preferably be disposed such that it is able to measure the temperature in the direct vicinity of the bimetallic element or the wire of the fuse or of the circuit breaker. A temperature-value range saved in the memory unit then relates preferably to the temperature of the bimetallic element or of the wire. It is likewise advantageously provided in this connection that the temperature-measuring unit is able to measure the ambient temperature of the fuse or of the circuit breaker and a temperature-value range saved in the memory unit is related to the ambient temperature. This embodiment with a temperature sensor provides a contribution in particular to increasing the safety of the protective device even further, by the fact that the opening and closing of the microswitch can take place on the basis of two variables (current and temperature) measured independently of one another, both of which are significant parameters in particular for a sustained overcurrent.

If the protective device comprises at least one further measuring unit in the form of a frequency-measuring, voltage-measuring, power-measuring or energy-measuring unit, it is thereby possible in particular to detect an overload of a power line connected to the protective device particularly early and reliably as well as to take load off the power line in the shortest time by immediate automatic opening of the microswitch, in order thereby to raise the quality of the current in the power line once again.

If the protective device comprises a frequency-measuring or voltage-measuring unit, at least one frequency-value and voltage-value range is saved in the memory unit, to define the frequency or voltage measured values that are not tolerated. Preferably such frequency-value or voltage-value ranges define an underfrequency or undervoltage condition, which occurs when the frequencies or voltages in the electrical circuit, as measured by the frequency-measuring or voltage-measuring unit, lie below the normal grid frequency or voltage by more than a definable limit value. Such undesired underfrequency or undervoltage conditions typically occur when the load in the electrical circuit is too great, e.g. due to a load step or an abrupt decrease of the grid current. This undesired condition is also known as a "brown-out", which may cause damage to devices in the electrical circuit and lead to a power outage in the grid.

If the protective device comprises a power-measuring unit or an energy-measuring unit, at least one power-value or energy-value range is saved in the memory unit, to define the measured values of power or energy that are not tolerated. Preferably such a power-value or energy-value range defines a condition of excessive power consumption or excessive energy consumption, which occurs when the power consumption measured by the power-measuring unit or the energy consumption measured by the energy-measuring unit exceeds a respective definable limit value.

If the protective device comprises an impedance-measuring unit, at least one impedance-value range is saved in the memory unit, to define the impedance measured values that are not tolerated. Preferably such an impedance-value range defines a high-impedance condition, which occurs when the impedance measured by the impedance-measuring unit exceeds a definable limit value. A high-impedance condition can be used in particular as an indicator that all loads within the electrical circuit are ready to be disconnected from the power line, e.g. when some loads have been completely switched off and some loads are merely in standby operation. The control unit of the protective device is able to bring about appropriate disconnection automatically by opening the microswitch, whereby a contribution is made in particular to reducing the electrosmog caused by the electrical circuit. The impedance-measuring unit may be configured as its own component or may be integrated in the current-measuring unit.

The explanations given in the following paragraph for the temperature-measuring unit also apply analogously for the other measuring units mentioned in the foregoing, and so reference thereto is made to avoid repetitions. The control unit is able to access the temperature measured values generated by the temperature-measuring unit and to compare them with the at least one temperature-value range saved in the memory unit. If the control unit determines in such a comparison that the temperature measured values lie in a temperature-value range saved in the memory unit, e.g. an overtemperature-value range defining an overtemperature condition of the wire of a fuse, it is able to open the microswitch.

The embodiment of the inventive protective device described in the foregoing, with at least one further measuring unit, may be advantageously modified to the effect that the control unit is set up to open the microswitch even when a current value generated by the current-measuring unit does not lie in a current-value range saved in the memory unit, when not even any current-value ranges and/or maximum continuous values are saved in the memory unit, when the control unit is not set up to process current values and/or when the protective device does not even have any current-measuring unit.

Particularly advantageously, it is further provided that at least one further maximum continuous value assigned to the at least one further value range is saved in the memory unit and the control unit is set up to open the microswitch when measured values lie in the further value range for longer than the further maximum continuous value. By means of the pair comprising a further value range and a further maximum continuous value assigned thereto, the maximum duration that will be tolerated without opening of the microswitch by the control unit is defined for a condition defined by the further value range. The control unit is able to measure the duration for which the measured values of the further measuring units mentioned in the foregoing lie in a value range corresponding to the respective type, to compare the measured duration with that further maximum continuous value associated with the further value range in question which is saved in the memory unit, and to open the microswitch if the further maximum continuous value is exceeded.

Furthermore, it is particularly advantageously provided that the value ranges and maximum continuous values are editable. Thereby the protective device can be adapted particularly flexibly and simply to different fuses and circuit breakers, for example, as well as to power lines, power supply grids and electrical circuits.

According to a further embodiment, it is advantageously provided that the control unit is set up, by processing of energy measured values generated by the energy-measuring unit, to generate an energy-consumption report that can be saved in the memory unit and that contains the energy consumption in the electrical circuit during a definable time period. Thus the energy consumed in the electrical circuit of the protective device can be recorded in the definable time period, e.g. for a day, a week, a month or a year. The definable time period is preferably saved in the memory unit of the protective device, so that the control unit is able to access it. The energy consumption report that can be saved in the memory unit may be accessed from outside the protective device, and so it can be further processed, for example, and/or displayed.

In this connection, it is particularly advantageously provided that the control unit is set up to distinguish between various energy-consuming loads in the electrical circuit and to generate an energy-consumption report for each individual load. This is made possible by evaluation of the load profile of the electrical circuit, whereby it may be determined in detail which load has consumed how much energy in a definable time period.

According to a further preferred embodiment, the protective device comprises at least one communications interface. Preferably at least one communications interface is provided that is set up to establish a direct communicative connection with at least one further protective device. Furthermore the communications interface can be set up to communicate with communications interfaces of external devices, e.g. computers or mobile telephones, especially smartphones. The communications interface is preferably set up to transmit data records saved in the memory unit and to receive data records to be saved in the memory unit, in which case the said data records may comprise, merely by way of example, value ranges, maximum continuous values, time periods, current values, further measured values or energy-consumption reports. In particular, external devices of an electricity supplier or of a grid operator are able to communicate with the communications interface and in this way influence in particular which microswitches are to be opened and/or closed under which conditions.

In this connection, it is particularly advantageously provided that the communications interface is set up to communicate wirelessly. By virtue of the absence of wiring, it is possible in particular to save overall space and installation expense. In this connection, it is possible to use WLAN, Bluetooth, infrared or other radio interfaces, for example, as communications interfaces.

According to a further embodiment, it is advantageously provided that the communications interface is set up to ensure access to the current values and/or the measured values. For this purpose IP addresses, for example, may be saved in the memory unit for comparison with devices that are trying to establish a connection with the communications interface. In particular, the communications interface is able to permit access to the values generated by the measuring units to a device of an electricity supplier that supplies a power line connected to the protective device with electricity, so that the electricity supplier receives information in real time, e.g. about the power being consumed at that instant in the electrical circuit of the protective device and is able to use this information, for example to control the electricity distribution in its supply grid.

Furthermore, the communications interface may be advantageously set up to deny access to the memory unit, at least partly. Thereby a contribution is made in particular to protecting the privacy of the protective-device user. In this way, for example, the communications interface is able to deny an electricity provider access to the energy-consumption reports saved in the memory unit.

The inventive protective system according to claims comprises several of the inventive protective devices described in the foregoing with respectively at least one communications interface, wherein the protective devices are communicatively connected to one another by communications interfaces. Via the communications interfaces, the protective devices are able in particular to exchange current values and other generated values with one another. Likewise, at least one protective device may be set up particularly preferably to control the microswitches at least of one other protective device.

For example, one of the protective devices—a "master protective device" as it were—in the protective system is able to assign a respective maximum permissible current value to other protective devices. The said other protective devices of the protective system are preferably disposed inside a fusebox, although it may also be provided that protective devices are connected outside the fusebox, directly upstream from an electrical load in question, and that they exchange their generated current values with at least one protective device inside the fusebox.

If a respective protective device measures a current value that exceeds the maximum permissible current value assigned to it, it may be provided particularly simply that the control unit of the protective device in question opens its microswitch. It is particularly preferable, however, that the master protective device is able to react flexibly to such a condition. Thus it is advantageously provided that the other protective devices transmit their generated current values to the master protective device by means of the communications interfaces. On the basis of the received current values and a definable maximum current value for the protective system, the master protective device is now able to modify the maximum permissible current values for the other protective devices to the effect that as many as possible microswitches of the protective devices are able to remain closed.

In this way, the power consumption in the electrical circuits assigned to the protective devices can be balanced flexibly among the protective devices. The protective devices, especially the master protective devices, of several protective systems are likewise able to communicate with one another in the manner mentioned in the foregoing, so that appropriate balancing of the power consumption is possible even at the level or several protective systems.

According to a first embodiment of the inventive protective system, it is advantageously provided that the protective devices are communicatively connected to one another in series by the communications interfaces and in this way form a communications chain. This embodiment, which in the minimum case may comprise two and in principle any desired number of inventive protective devices ensures that the protective devices of the communications chain are able to exchange information with one another particularly rapidly and that opening and/or closing of the microswitches can be coordinated particularly rapidly among the protective devices. For example, a first and a last protective device, which are disposed at the two ends of the communications chain, may each have a communications interface by which they are respectively communicatively connected to the protective device directly adjacent to them. The protective devices between the first and the last protective devices may have, for example, two communications interfaces each, by which they are respectively communicatively connected to the protective devices adjacent to them. In particular, current values, measured values and other data records can be transmitted particularly rapidly via the communications chain to the other protective devices, processed and used for control of the opening and/or closing of microswitches of the protective devices. In this connection, it is likewise advantageously provided that at least one of the protective devices within the communications chain is further communicatively connected via a communications interface to at least one further protective device—which in turn may likewise be part of a further communications chain—outside the communications chain, whereby priorities, especially of the protective devices, with respect to the sequence of opening and closing of their circuit breakers can be defined particularly flexibly.

According to a further embodiment of the inventive protective system, the protective devices are additionally communicatively connected to one another by a common bus system. The bus system ensures in particular that it is possible to communicate centrally with the protective devices of the communications chain, in order, for example, to change data records saved in the memory units or to access them. Furthermore, the bus system forms a redundancy in the event, for example of failure of a communications interface within the communications chain.

In this connection, it is particularly advantageously provided that the bus system comprises a communications unit having a further communications interface. The further communications interface may be formed, for example, by a LAN, WLAN, Bluetooth or infrared interface. The communications unit is set up to communicate with various external devices, e.g. computers or mobile telephones, especially smartphones. In particular, external devices of an electricity supplier are able to communicate with the further communications interface and in this way influence in particular which microswitches must be opened and/or closed under which conditions.

The inventive method according to the claims for control of an inventive protective system described in the foregoing, in which the protective devices are in communicative connection in series with one another via the communications interfaces and thereby form a communications chain, the protective devices of which are connected in parallel to a common power line, comprises the method steps of
    defining a maximum permissible current value for the first protective device,
    calculating a maximum permissible current value for each of the other protective devices as a function of the maximum permissible current value of the protective device respectively disposed upstream in the communications chain, and
    opening the microswitch of each of the other protective devices for which the maximum permissible current value is negative.

The common power line may be supplied with alternating current, for example, by the power-supply grid of an electricity supplier. Furthermore, however, a decentralized generator is able to inject current, e.g. three-phase current, into the power line. Furthermore, direct current generated by photovoltaic systems or supplied by battery storage, for example, may also be flowing in the power line.

The maximum permissible current value for the first protective device can be defined in such a way, for example, that it is saved as the value range in the memory unit of the first protective device, in which case the value range encompasses all values that are greater than the maximum permissible current value. The microswitch of the first protective device can then be opened by its control unit, for example when current values generated by the current-measuring unit of the first protective device lie in the aforesaid value range. The maximum permissible current value of the second protective device is calculated as a function of the maximum permissible current value for the first protective device, preferably in the control unit of the first protective device. The maximum permissible current value for the other protective devices—if such are present—is calculated by analogy with the calculation for the second protective device.

A value range comprising negative maximum permissible current values is saved in the memory unit. A negative maximum permissible current value for a protective device means that more current is already flowing through the upstream protective devices in the communication channel than is defined by the maximum permissible current value for the first protective device. In this case, the microswitch of the protective device in question is opened, whereby an electrical circuit connected to the protective device is disconnected from the power line. The maximum permitted current value for all downstream protective devices is also negative, and so their microswitches are likewise opened. The method is particularly well suited for assigning a consumption priority which is highest for the first protective device, decreases for each further protective device and is lowest for the last protective device. By virtue of the inventive method, electrical circuits of protective devices can be disconnected from the power line particularly simply, effectively and transparently.

A first embodiment of the inventive method according to the claims is advantageously characterized by calculation of the maximum permissible current value for each of the other protective devices by means of measuring a current intensity and generating a current value representing the measured current intensity by the current-measuring units of the first to the second-last protective device in the communications chain, generating a current value representing the measured current intensity, subtracting the current value generated in a respective protective device from the maximum permissible current value for the respective protective device by means of the control unit of the respective protective device, and transmitting the difference value to the respective downstream protective device in the communications chain via the communications chain.

The maximum permissible current value for the second protective device is calculated in the control unit of the first protective device from the difference between the maximum permissible current value defined for the first protective device and a current value generated by the current-measuring unit of the first protective device then transmitted to the second protective device via the communications chain. The maximum permissible current value for the third protective device—if such is present—is calculated in the control unit of the second protective device from the difference between the maximum permissible current value calculated for the second protective device and a current value generated by the current-measuring unit of the second protective device then transmitted to the third protective device via the communications chain. The calculation of the maximum permissible current values for the other protective devices—if such are present—and the transmission of the difference values take place in analogous manner.

In other words, the maximum permissible current intensity that may be measured in a protective device without causing its control unit to open the microswitch is limited to the value of the maximum permissible current value for the first protective device minus the sum of the current intensities measured in the upstream protective devices of the communications chain. Thus the maximum permissible current value has the largest value for the first protective device and the smallest for the last protective device. In each case the current values generated by the current-measuring units are preferably the last current value that was generated by the respective current-measuring unit and that represents the current intensity presently being measured by the current-measuring unit. The first embodiment permits a particularly in-the-present, simple and effective way of coordinating the opening of microswitches or the associated disconnection of electrical circuits from the power line.

Preferably the maximum permissible current value is defined with consideration of the design of the common power line or of the current intensity that can be supplied in it. For example, if the current in the common power line is limited by a fuse, then the maximum permissible current value is preferably smaller than the value of the blowing current intensity of the fuse. This is particularly advantageous, because by opening a sufficient number of microswitches it is possible in particular to prevent the fuse of the common power line from having to be blown. The fuse serves only for redundancy in the event that a microswitch does not open in time.

Furthermore, the maximum permissible current value can be defined in such a way that it does not exceed a current intensity that is available in the power line and that can be specified, for example, by a user or else externally by an electricity supplier, e.g. via the common power line. This makes it possible for a user of the protective system to limit the total current flowing through the electrical circuits of the protective devices and thus to save electricity particularly easily. An electricity supplier has the ability among others to react flexibly to fluctuations in the availability of electricity in its supply grid, by adapting the maximum permissible current value appropriately for the first protective device and thus also for the entire protective system.

A further embodiment of the inventive method according to the claims advantageously provides for measuring a current intensity and generating a current value representing the measured current intensity by the current-measuring unit of the last protective device in the communications chain, subtracting the current value generated in the last protective device from the maximum permissible current value for the last protective device by means of the control unit of the last protective device, and transmitting the difference value to the other protective devices via the communications chain.

According to this embodiment, a difference value is calculated in the last protective device and transmitted to the other protective devices to specify how much current at most is still permitted to flow additionally in the protective devices without causing at least one microswitch to be disconnected. In this connection, it is particularly advantageously provided that the calculation of the maximum permissible current values for the second to the last protective device, the calculation of the difference value in the last protective device and the transmission of the difference value to all other protective devices take place within the duration of one period of a current flowing in the common power line, whereby particularly rapid coordination of the opening of microswitches is achieved. Even when a direct current is flowing in the common power line, current measurements can likewise be made at correspondingly high frequency, for example by defining corresponding time values in the protective devices.

A further advantageous embodiment is characterized by saving, in the memory unit of the protective device, a current value that was last generated by the current-measuring unit of a protective device before its microswitch was opened, and closing the opened microswitch when a maximum permissible current value for the protective device, calculated after opening, is higher than the saved current value.

Furthermore, maximum permissible current values for the protective device are also calculated after opening of a circuit breaker of a protective device. When the maximum permissible current value is lower than the saved current value that was last to be measured before the microswitch was opened, then the microswitch continues to remain open. If the microswitch were instead of this to be closed again and—which is at least possible—the same or approximately the same current intensities are being measured in the electrical circuit, then the control unit would immediately open the microswitch again, because a current value generated after closing of the microswitch would exceed the maximum permissible current value for the protective device and the latter would become negative. This could lead to an unstable operating condition of the protective system, in which the microswitch would open and close continuously. Therefore the microswitch is closed again only when a maximum permissible current value calculated for the protective device in question is at least as high as the saved current value. This embodiment makes a contribution in that an opened microswitch is closed again after a particularly short time and thus an electrical circuit disconnected from the common power line is supplied with current once again particularly rapidly without causing unstable operating conditions of the protective system.

The inventive method according to the claims for control of an inventive protective system described hereinabove, in which the protective devices are communicatively connected with one another in series by the communications interfaces and thereby form a communications chain and its protective devices are connected in parallel to a common power line, comprises the method steps of
- defining a maximum permissible current value,
- defining an opening maximum continuous value for each protective device,
- calculating remaining maximum permissible current values respectively as a function of a sum of respectively one current value of all protective devices,
- opening the microswitch of a protective device when remaining maximum permissible current values are negative without interruption for longer than the opening maximum continuous value for the protective device.

The maximum permissible current value can be defined, for example, by saving a corresponding value in at least one of the memory units of the protective devices, preferably in the memory unit of the first or last protective device in the communications chain. The opening maximum continuous values are preferably defined by saving a corresponding value in each of the memory units of the protective devices. The remaining maximum permissible current values are calculated in such a way that respectively one current value of each protective device are added together several times in succession. When the current-value sums formed thereby exceed the maximum permissible current value without interruption for longer than the opening maximum continuous value for a protective device, then the microswitch of the protective device is opened, whereby an electrical circuit connected to the protective device is disconnected from the common power line.

According to the inventive method of the claims any desired arbitrary switch-off priority may be assigned to each protective device in the communications chain, by selecting an appropriately high opening maximum continuous value for the protective device. The opening maximum continuous value for a protective device determines how long consecutive remaining maximum permissible current values must remain negative before the microswitch of the protective device is opened. Protective devices for which a shorter opening maximum continuous value is defined open correspondingly more rapidly than protective devices for which a longer opening maximum continuous value is defined. These opening maximum continuous values are preferably selected to be shorter than the duration within which a fuse of the power line would blow.

According to a first advantageous embodiment, the definition of a closing maximum continuous value for each protective device is advantageously provided, as is the closing of an opened microswitch of a protective device when, after opening of the microswitch, calculated maximum permissible current values are positive without interruption for longer than the closing maximum continuous value defined for the protective device.

By defining the maximum continuous values for closing, it is possible to assign re-switch-on priorities to the protective devices by the fact that—if, after opening of the microswitch, calculated remaining maximum permissible current values are again positive without interruption—protective devices for which a shorter closing maximum continuous value was defined close their opened microswitches again more rapidly than protective devices for which a longer closing maximum continuous value was defined. A combination of switch-off and switch-on priorities is particularly preferably provided in order to generate a particularly clear and unequivocal total priority of the protective devices. For this purpose, longer opening and shorter closing maximum continuous values will be defined for protective devices to which a higher total priority will be assigned than for protective devices to which a lower total priority will be assigned.

A further advantageous improvement of the inventive method according to the claims is characterized by
- forming the sums respectively of one current value of all protective devices by serial addition of respectively one presently existing current value of all protective devices, and
- calculating the remaining maximum permissible current values by subtracting the respective formed sum from the defined maximum permissible current value.

Serial addition will be understood as follows: The current-measuring unit of the first protective device generates a current value and transmits it to the second protective device. The current-measuring unit of the second protective device generates a current value, adds it to the current value transmitted by the first protective device and transmits the sum to the third protective device. The third and each further protective device—if such are present—proceed in the same way as the second protective device. The current values are the respective presently existing current values, preferably those that were last generated by the current-measuring units and that represent the presently existing current values, preferably the last to be measured by the current-measuring units. The steps described in the foregoing are repeated, whereby the sums of respectively one current value of all protective devices are formed. The formed sums are respectively subtracted from the maximum permissible current value, and the remaining maximum permissible current values are obtained from this. The addition and subtraction are preferably performed by the control units of the respective protective devices.

The transmission of the remaining maximum permissible current values to all other protective devices via the communications chain is advantageously further provided, which in particular has the advantage that the transmitted remaining maximum permissible current values can be transmitted particularly rapidly to all protective devices and be available for the decision on opening and/or closing of a microswitch. In this connection, it is particularly advantageously provided that the calculation of a remaining maximum permissible current value and its transmission to all other protective devices takes place within the duration of one period of the current flowing in the common power line, whereby particularly rapid coordination of the opening and/or closing of microswitches of protective devices within the communications chain is possible. Even when a direct current is flowing in the common power line, current measurements can likewise be made at correspondingly high frequency, for example by defining corresponding time values in the protective devices.

Furthermore, for control of an inventive protective system described hereinabove, in which a common electrical circuit is connected with respectively one output of several protective devices and respectively one power line is connected with respectively one input of the protective devices, the following steps may be advantageously provided:
- defining an opening maximum continuous value for each protective device;
- determining the opening conditions of the microswitch of each protective device and transmitting the determined opening condition to all other protective devices, as well as opening the microswitch of each protective device when opening conditions transmitted to it indicate, for longer than the opening maximum continuous value defined for it, that aside from its microswitch, at least one of the remaining microswitches is still closed.

By virtue of the described opening of all except one circuit breaker, it is possible to ensure that only one of the microswitches of all protective devices is closed simultaneously, so that the common electrical circuit having at least one load is connected exclusively to one of the power lines. In particular, those conditions in which the microswitch is open or closed or is scheduled to be closed fall under open condition. Which of the power lines is to remain connected to the electrical circuit can be controlled in particular by the definition of opening continuous values of different lengths.

The individual power lines can be fed by respectively a power source of their own, including among others the individual phases of a multi-phase current, e.g. a three-phase current, or different other power sources, such as direct currents of photovoltaic systems or battery storage, or alternating current of a central power-supply grid. Respectively one output of the protective devices is connected to a common electrical circuit. In each protective device, the opening condition of the microswitch is determined and can be transmitted to all other protective devices, e.g. via the communications interfaces and/or via the common bus system. The described determination and transmission are preferably repeated constantly.

For example, if a protective device in which the microswitch is closed receives, in this way, the information that the microswitch at least of one other protective device is to be closed, then it will open its microswitch by means of its control unit, provided it does not receive, during the period of the opening maximum continuous value defined for it, which begins to run, for example, upon receipt of the information, new information according to which none of the other microswitches is to be opened.

Furthermore, for control of an inventive protective system described hereinabove, in which a common electrical circuit is connected with respectively one output of several protective devices, and respectively one power line, in which respectively one phase of a multi-phase current is flowing, is connected with respectively one input of the protective devices, the following steps may be advantageously provided:

opening the microswitch of each protective device,
determining the readiness of each protective device to close its microswitch, and transmitting the determined readiness to all other protective devices, and
simultaneously closing the microswitch of each productive device when the information that the other protective devices are ready to close their microswitches has been transmitted to each protective device.

This permits in particular the simultaneous or approximately simultaneous closing of the microswitches of all protective devices, whereby the electrical circuit connected commonly to the outputs of the productive devices can be fed simultaneously with all phases of the multi-phase current. This is particularly advantageous, for example, for starting and for the operation of a multi-phase electric motor, which may be disposed in the electrical circuit. This determination of the readiness of a protective device to close its microswitch can be performed, for example, by means of an impedance-measuring unit described hereinabove, within the duration of one period of the multi-phase current, the individual phases of which are flowing in the individual power lines. When the said readiness has been determined by each protective device and transmitted to all other protective devices, the microswitches of all protective devices are closed simultaneously by their control units.

BRIEF DESCRIPTION OF THE DRAWINGS

The invention will be explained hereinafter by exemplary embodiments on the basis of the drawing, wherein.

DETAILED DESCRIPTION OF THE PREFERRED EMBODIMENTS

Figure 1:
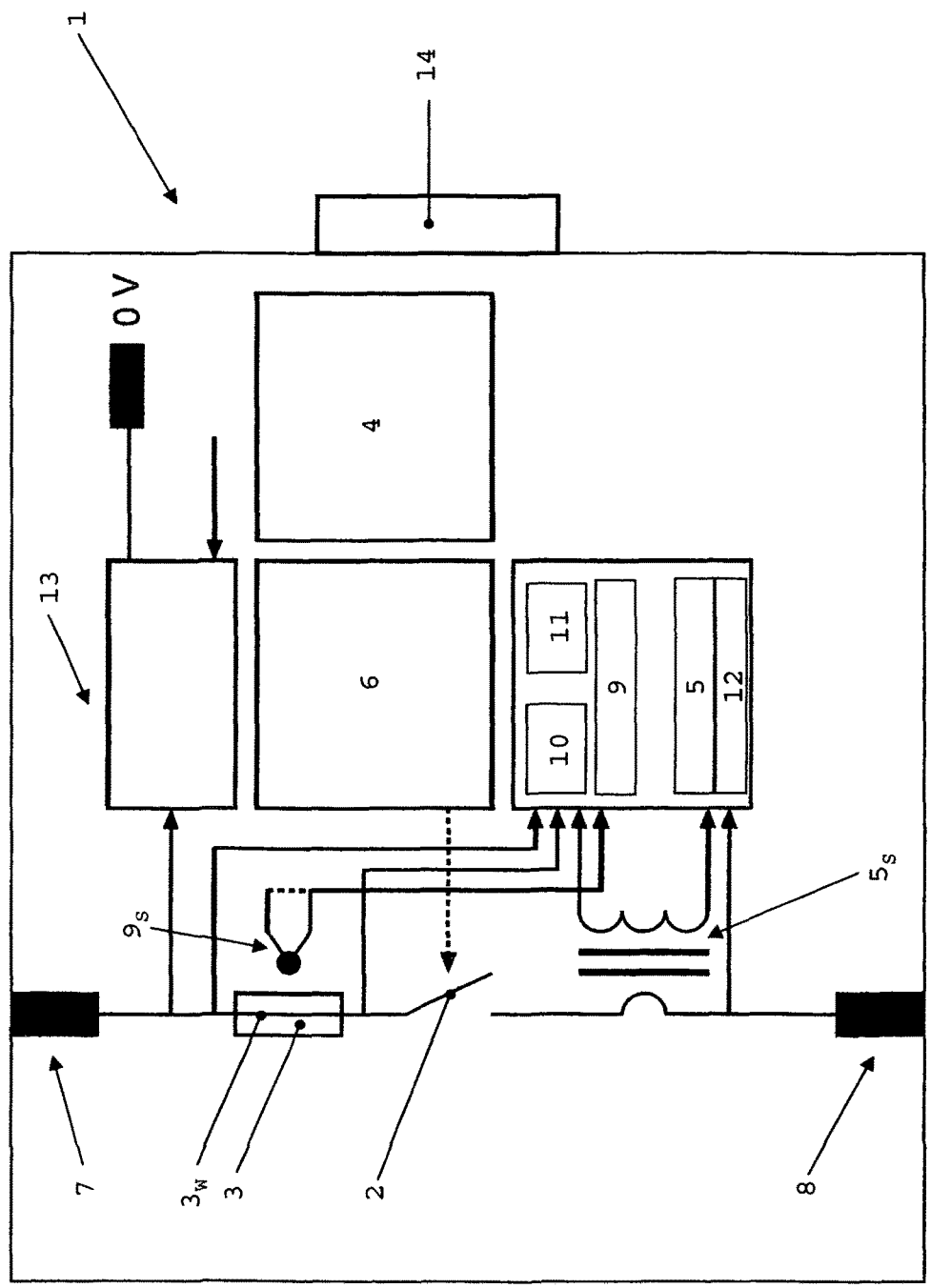
FIG. 1 shows the schematic layout of an exemplary embodiment of an inventive protective device.

The exemplary embodiment of an inventive protective device 1 shown in FIG. 1 comprises a microswitch 2, which is connected in series with a fuse 3, a memory unit 4, a current-measuring unit 5 and a control unit 6. Instead of fuse 3, protective device 1 may alternatively also comprise a circuit breaker, not illustrated. Furthermore, protective device 1 comprises an input 7 for connection to a current-carrying power line and an output 8 for connection to an electrical circuit with at least one electrical load.

Current-measuring unit 5 is able to measure current intensities between microswitch 2 and output 8 by its current sensor 5s and to generate current values that represent measured current intensities and can be processed by control unit 6. Two current-value ranges are saved in memory unit 4, namely a sustained overcurrent-value range, which defines a sustained overcurrent condition, and a short-circuit current value range, which defines a short-circuit condition. Furthermore, a sustained overcurrent maximum continuous value assigned to the sustained overcurrent value range and a short-circuit current maximum continuous value assigned to the short-circuit value range are saved in memory unit 4.

Control unit 6 is set up to open microswitch 2 by commands suitable for the purpose, without blowing fuse 3, when a current value generated by current-measuring unit 5 lies in one or both of the two aforesaid value ranges. Control unit 6 is likewise set up to close microswitch 2 again automatically, so that no replacement or resetting of fuse 3 is necessary after a sustained overcurrent condition or a short-circuit condition.

Furthermore, a sustained overcurrent maximum continuous value assigned to the sustained overcurrent value range and a short-circuit maximum continuous value assigned to the short-circuit value range are saved in memory unit 4. According to a further mode of operation, control unit 6 is able to open microswitch 2 when it detects by a comparison that the current values generated by current-measuring unit 5 lie in the sustained overcurrent value range and/or short-circuit value range for a duration longer than the sustained overcurrent maximum continuous value and/or the short-circuit maximum continuous value.

Protective device 1 further has a temperature-measuring unit 9, which has a temperature sensor 9s in the immediate vicinity of fuse 3, so that it is able to measure temperatures in the vicinity of wire 3w in the interior of fuse 3 and to generate a temperature measured value representing the measured temperature. An overtemperature value range, which defines an overtemperature condition of wire $3w_\neg$ of fuse 3, and an overtemperature maximum continuous value assigned to the overtemperature value ranges are saved in memory unit 4.

According to a further mode of operation, control unit 6 is able to open microswitch 2 when it detects by a comparison that the current values generated by current-measuring unit 5 lie in the sustained overcurrent value range for a duration longer than the sustained overcurrent maximum continuous value and the temperature measured values generated by temperature-measuring unit 9 lie in the overtemperature value range for a duration longer than the sustained overtemperature maximum continuous value.

Furthermore, protective device 1 comprises further measuring units in the form of a frequency-measuring unit 10, a voltage-measuring unit 11 and a power-measuring unit 12, as well as an energy-measuring unit integrated in power-measuring unit 12 and an impedance-measuring unit integrated in current-measuring unit 5. The further measuring units 9-12 are set up to measure frequencies, voltages, powers, energies and impedances in protective device 1 and to generate the frequency, voltage, power, energy or impedance measured values representing the measured frequencies, voltage, powers, energies and impedances respectively. Value ranges corresponding to the type of the respective further measuring unit are saved in memory unit 4, namely an underfrequency and an undervoltage value range, which define a condition of abnormally low frequency or voltage, an overpower and an overconsumption value range, which respectively define a condition of excessive power consumption or excessive energy consumption, as well as a high-impedance value range, which defines a condition in which loads in the electrical circuit of the protective devices are regarded as ready to be switched off. Furthermore, a further maximum continuous value assigned respectively to the said further value ranges is saved in memory unit 4.

According to a further mode of operation of the inventive protective device, its control unit 6 opens microswitch 2 when
    current values generated by current-measuring unit 5 lie in the overcurrent value range saved in the memory unit for a duration longer than the overcurrent maximum continuous value saved in the memory unit (1st opening criterion) and
    measured values generated by the corresponding further measuring unit 9-12 lie in the further value range assigned to the further maximum continuous value for a duration longer than one of the further maximum continuous values (2nd opening criterion).

According to yet a further mode of operation, control unit 6 is set up to open microswitch 2 even when only the second opening criterion is met.

According to a further mode of operation, control unit 6 is further set up to generate and save in memory unit 4 an energy-consumption value that contains the energy consumption of an electrical circuit that can be connected to output 8 during a consumption time period saved in memory unit 4. For this purpose, control unit 6 adds the power measured values generated by power-measuring unit 12 cumulatively during the consumption time period. According to yet a further mode of operation, control unit 6 is set up to generate an energy-consumption value for different loads in the electrical circuit by evaluation of a load profile and to save it in memory unit 4.

For the power supply of protective device 1, protective device 1 further has a power-supply unit 13, which can be fed either by the power grid that can be connected to input 7 or by another voltage source. Furthermore, protective device 1 comprises a communications interface 14 for wireless data transmission. Communication interface 14 permits external communications interfaces, not illustrated, with specified IP addresses to access the measured values generated in protective device 1. However, access to the energy-consumption values saved in memory unit 4 is possible only by entry of a user name and password that can be defined by the user of protective device 1, whereby an electricity supplier in particular has no access to the energy-consumption values.

Figure 2:
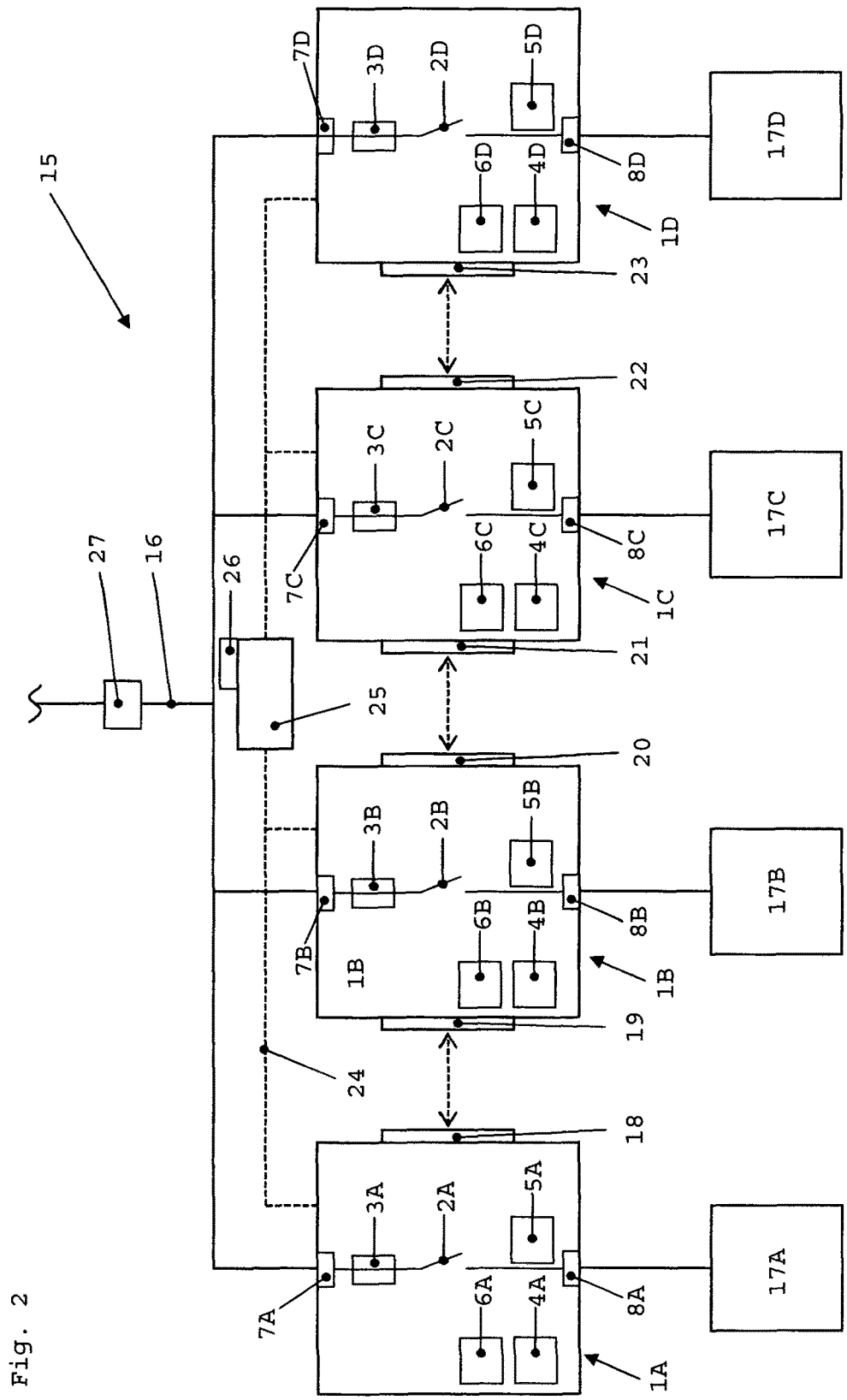
FIG. 2 shows the schematic layout of an exemplary embodiment of an inventive protective system, the protective devices of which are connected on the input side with a common power line and on the output side with respectively one individual electrical circuit.

Protective system 15 according to FIG. 2 comprises four protective devices 1A-1D, which are respectively similar to protective device 1 shown in FIG. 1. Each protective device 1A-1D is connected at its input 7A-7D to a common power line in the form of an alternating-current-carrying grid 16, which carries an alternating current supplied by a central electricity supplier. Furthermore, each protective device 1A-1D is connected at its output 8A-8D to respectively one electrical circuit 17A-17D of its own, containing several loads, not illustrated. Protective devices 1A-1D are communicatively connected with one another in series via communication interfaces 18-23 communicating wirelessly with one another, and thereby they form a communications chain. For this purpose, protective devices 1A, 1D at the end of the communications chain respectively comprise one communications interface 18, 23, and the other protective devices 1B, 1C respectively comprise two communications interfaces 19-22. Furthermore, protective devices 1A-1D are communicatively connected with one another via a common bus system 24, which comprises a communications unit 25 with a further communications interface 26.

The control and the operation of protective system 15 shown in FIG. 2 will be explained hereinafter on the basis of exemplary embodiments of the inventive method. Grid 16 has a grid fuse 27, which blows when a blowing current intensity is reached. The value of the blowing current intensity is saved permanently in memory unit 4A of first protective device 1D.

According to one mode of operation of protective system 15, the maximum permissible current value for first protective device 1A is defined by the saved value of the blowing current intensity, and from this control unit 6A of first protective device 1A subtracts the current value that was last determined by its current-measuring unit 5A and that represents a current intensity, last measured by current-measuring unit 5A, between microswitch 2A and output 8A of first protective device 1A. The difference value corresponds to the maximum permissible current value, which is transmitted to second protective device 1B in the communications chain, for second protective device 1B. The transmission takes place by means of two communicatively connected communications interfaces 18, 19 of first protective device 1A and second protective device 1B respectively.

Control unit 6B of second protective device 1B subtracts, from the maximum permissible current value obtained for second protective device 1B, the current value that was last determined by its current-measuring unit 5B and that represents a current intensity, last measured by current-measuring unit 5B, between microswitch 2B and output 8B of second protective device 1B. The difference value corresponds to the maximum permissible current value for third protective device 1C, which is transmitted to third protective device 1C in the communications chain by means of two communicatively connected communications interfaces 20, 21 of second protective device 1B and third protective device 1C. The calculation of the maximum permissible current value for fourth protective device 1D and its transmission to fourth protective device 1D take place in a manner analogous to that for second protective device 1B.

Control unit 6D of fourth protective device 1D subtracts, from the maximum permissible current value obtained for fourth protective device 1D, the current value that was last determined by its current-measuring unit 5D and that represents a current intensity, last measured by current-measuring unit 5D, between microswitch 2D and output 8D of fourth protective device 1D. The difference value corresponds to a remaining maximum permissible current value for protective system 15 and is transmitted to all other protective devices 1A-1C via the communications chain.

By this type of definition of calculation of the maximum permissible current value for protective devices 1A-1D, first protective device 1A receives the highest priority with respect to the possible electricity consumption. The priority decreases from protective device to protective device within the communications chain and is lowest for fourth protective device 1D. The respective control units 6B-6D of the second to the last protective devices 1B-1D open their microswitches 2B-2D when the maximum permissible current value for protective device 1B-1D in question is negative. Control unit 6A of first protective device 1A opens its microswitch 2A when the difference value formed in first protective device 1A is negative.

In this connection, a method cycle, which comprises the calculation of the maximum permissible current values for all protective devices 1A-1D and the transmission of the remaining maximum permissible current values for protective system 15 to all other protective devices 1A-1C, takes place within the duration of one period of the alternating current flowing in grid 16. A completely accomplished method cycle is followed directly by the next method cycle, so that, in each period of the alternating current flowing in the grid, it is newly decided by control units 6A-6D of protective devices 1A-1D whether a microswitch 2A-2D will be opened.

The closing of a previously opened microswitch 2A-2D takes place by the fact that the current value generated by current-measuring unit 5A-5D of protective device 1A-1D in question before opening of microswitch 2A-2D is saved in memory unit 4A-4D of protective device 1A-1D and microswitch 2A-2D is closed again when a calculated maximum permissible current value for protective device 1A-1D, presently available after opening of microswitch 2A-2D, is higher than the saved current value.

According to a further mode of operation of protective system 15, a maximum permissible current value is defined by the value of the blowing current intensity of grid fuse 27 saved in memory unit 4A of first protective device 1A. The sum of respectively one current value of all protective devices 1A-1D is subtracted from the maximum permissible current value.

For this purpose, control unit 6A of first protective device 1A subtracts, from the maximum permissible current value, the current value last determined by current-measuring unit 5A of first protective device 1A. The formed difference value is transmitted to second protective device 1B in the communications chain. Control unit 6B of second protective device 1B subtracts, from the obtained difference value, the current value that was last determined by current-measuring unit 5B of second protective device 1B. The formed difference value is transmitted to third protective device 1C, in which a difference value is formed in a manner analogous to that of second protective device 1B and transmitted to fourth protective device 1D. Fourth protective device 1D subtracts, from the obtained difference value, the current value last determined by its current-measuring unit 5D. The formed difference value corresponds to a remaining maximum permissible current value for protective system 15 and is transmitted via the communications chain to the first three protective devices 1A-1C.

In this connection, a method cycle, which comprises the formation of difference values in all protective devices 1A-1D and the transmission of the remaining maximum permissible current value to the first three protective devices 1A-1C, takes place within the duration of one period of the alternating current flowing in grid 16. A completely accomplished method cycle is followed directly by the next method cycle, so that the remaining maximum permissible current value is transmitted to each protective device 1A-1D in each period of the alternating current flowing in grid 16.

Furthermore, an opening maximum continuous value is respectively saved in memory units 4A-4D of all protective devices 1A-1D. When the remaining maximum permissible current values transmitted via the communications chain are negative without interruption for longer than the opening maximum continuous value of a protective device 1A-1D, then their control unit 6A-6D opens microswitch 2A-2D. Thus protective device 6A-6D, in the memory unit 4A-4D of which the longest opening maximum continuous value is saved, receives the highest priority with respect to the possible current consumption, and protective device 1A-1D, in the memory unit 4A-4D of which the lowest opening maximum continuous value is saved, receives the lowest priority.

Figure 3:
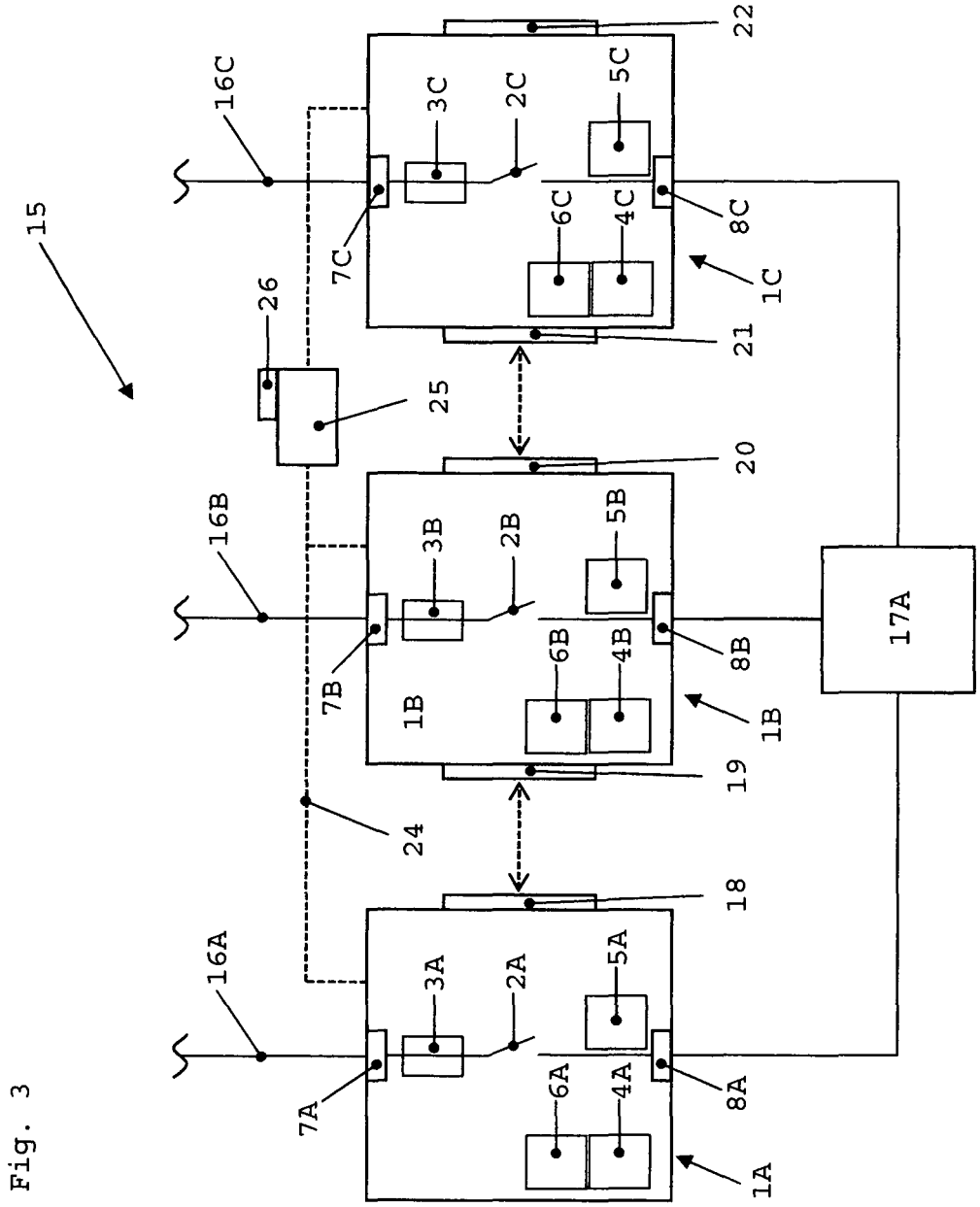
FIG. 3 shows the schematic layout of a further exemplary embodiment of an inventive protective system, the protective devices of which are connected on the input side with respectively one power line of their own and on the output side with a common electrical circuit.

The further exemplary embodiment of an inventive protective system 15 shown in FIG. 3 comprises the first three protective devices 17A-17C already illustrated in FIG. 2. By means of four communications interfaces 18-21 in total, these form a communications chain in the already explained way. Furthermore, protective devices 1A-1C are also communicatively connected with one another via a common bus system 24 having a communications unit 25, which comprises a further communications interface 26. A power line 16A-16C of a three-phase generator, not illustrated, is connected respectively to the three inputs 7A-7C of protective devices 1A-1C, wherein each of the power lines 16A-16C carries one phase of the three-phase current. The three outputs 8A-8C of protective devices 1A-1C are connected to a common electrical circuit 17A, which contains several loads, not illustrated.

According to one mode of operation of protective system 15 shown in FIG. 3, it is provided that respectively all microswitches except one are open. For this purpose, an opening maximum continuous value, which is longest for first protective device 1A, shorter for second protective device 1B than for first protective device 1A and shortest for third protective device 1C, is respectively saved in memory units 8A-8C of protective devices 1A-1C.

Within the duration of one period of the phase carried in the respective power line 16A-16C, microswitches 2A-2C determine their opening condition and transmit it immediately via common bus system 24 to all other protective devices 1A-1C. Alternatively or additionally, the transmission may also take place via the communications chain. Thus, within the duration of one period of the three-phase current, each protective device 1A-1C is informed about which microswitches 2A-2C are open or closed.

For example, if microswitches 2A, 2B of first protective device 1A and of second protective device 1B are closed, control unit 6B of second protective device 1B will open its microswitch 2B when the said obtained information about the opening conditions persists for longer than the opening maximum continuous value for second protective device 1B. Control unit 6A of first protective device 1A will not open its microswitch 2A, because the opening maximum continuous value for first protective device 1A is longer than that for second protective device 1B and thus, after opening of microswitch 2B of second protective device 1B, no protective device 1B, 1C other than first protective device 1A has a closed microswitch 2B, 2C any longer.

According to a further mode of operation of protective system 15 shown in FIG. 3, it is provided that all microswitches 2A-2C are opened and closed again simultaneously. This mode of operation may be considered when, for example, a three-phase electric motor, not shown, is to be started and operated in electrical circuit 17A. Closing of microswitches 2A-2C takes place after it has been determined in each protective device 1A-1C that their microswitches 2A-2C are ready to be switched on and the corresponding information has been made available to all other protective devices 1A-1C by transmission.

What is claimed is:

1. A method for control of a protective system (15) comprising a plurality of protective devices, each of the plurality of protective devices comprising:
    a microswitch (2) connected in series with a fuse (3) or a circuit breaker
    a current-measuring unit (5);
    a memory unit (4);
    a control unit (6); and
    at least one communications interface (14, 18-23), wherein;
    at least one current-value range is saved in the memory unit (4),
    the current-measuring unit (5) is set up to measure current intesnsities in the protective device (1) and to generate current values representing the measuring current intensities,
    the control unit (6) is set up to process the current values, to open the microswitch (2) when a current values lies within the current-value range and to close the microswitch (2) again after it has been opended,
    and wherein the protective devices (1) are communicatively connected to one another in series by the communications interfaces and in this way form a communications chain, wherein the protective devices (1A-1D) are connected in parallel to a common power line (16), the method comprising the steps of
    defining a maximum permissible current value for the first protective device (1A),
    calculating a maximum permissible current value for each of the other protective devices (1B-1D) as a function of the maximum permissible current value of the protective device (1A-1C) respectively disposed upstream in the communications chain, and
    opening the microswitch (2B-2D) of each of the other protective devices (1B-1D) for which the maximum permissible current value is negative.

2. The method of claim 1, further comprising calculation of the maximum permissible current value for each of the other protective devices (1B-1D) by means of
    measuring a current intensity and generating a current value representing the measured current intensity by the current-measuring units of the first protective device (1A) to the second-last protective device (1C) in the communications chain,
    subtracting the current value generated in a respective protective device (1A-1C) from the maximum permissible current value for the respective protective device (1A-1C) by means of the control unit of the respective protective device (1A-1C), and
    transmitting the difference value to the respective downstream protective device (1B-1D) in the communications chain via the communications chain.

3. The method of claim 1, wherein the maximum permissible current value for the first protective device (1A) is smaller than the value of the blowing current intensity of a fuse (27) of the common power line (16) or is not greater than the value of a current intensity available in the common power line (16).

4. The method of claim 1, further comprising:
    measuring a current intensity and generating a current value representing the measured current intensity by the current-measuring unit (5D) of the last protective device (1D) in the communications chain,
    subtracting the current value generated in the last protective device (1D) from the maximum permissible current value for the last protective device (1D) by means of the control unit (6D) of the last protective device (1D), and
    transmitting the difference value to the other protective devices (1A-1C) via the communications chain.

5. The method of claim 4, wherein the calculation of the maximum permissible current values for the second protective device (1B) to the last protective device (1D), the calculation of the difference value in the last protective device (1D) and the transmission of the difference value to all other protective devices (1A-1C) take place within the duration of one period of a current flowing in the common power line (16).

6. The method of claim 1, further comprising
    saving, in the memory unit (4A-4D) of the protective device (1A-1D), a current value that was last generated by the current-measuring unit (5A-5D) of a protective device (1A-1D) before its microswitch (2A-2D) was opened, and
    closing the opened microswitch (2A-2D) when a maximum permissible current value for the protective device (1A-1D), calculated after opening, is higher than the saved current value.

7. A method for control of e protective system (15) comprising a plurality of protective devices, each of the plurality of protective devices comprising;
    a microswitch (2) connectioned in series with a fuse (3) or a circuit breaker;
    a current-measuring unit (5);
    a memory unit (4);
    a control unit (6); and
    at least one communications interface (14,18-23), wherein;
    at least one current-value range is saved in the memory unit (4),
    the current-measuring unit (5) is set up to measure current inesnsities in the protective device (1) and to generate current values representing the measuring current intensities,
    the control unit (6) is set up to process the current values, to open the microswitch (2) when a current value lies within the current-value range and to close the microswitch (2) again after it has been opened, and wherein the protective devices (1) are communicatively connected to one another in series by the communications interfaces and in this way form a communications chain, wherein the protective devices (1A-1D) are connected in parallel to a common power line (16), the method comprising the steps of defining a maximum permissible current value, defining an opening maximum continuous value for each protective device (1A-1D), calculating remaining maximum permissible current values respectively as a function of a sum of respectively one current value of all protective devices (1A-1D), opening the microswitch of a protective device (1A-1D) when remaining maximum permissible current values are negative without interruption for longer than the opening maximum continuous value of the protective device (1A-1D).

8. The method of claim 7, further comprising defining a closing maximum continuous value for each protective device (1A-1D), closing an opened microswitch (2A-2D) of a protective device (1A-1D) when, after opening of the microswitch, calculated maximum permissible current values are positive without interruption for longer than the closing maximum continuous value defined for the protective device (1A-1D).

9. The method of claim 7, further comprising forming the sums respectively of one current value of all protective devices (1A-1D) by serial addition of respectively one presently existing current value of all protective devices (1A-1D), and calculating the remaining maximum permissible current values by subtracting the respective formed sum from the defined maximum permissible current value.

10. The method of claim 7, further comprising transmission of the remaining maximum permissible current values to all other protective devices (1A-1C) via the communications chain.

11. The method of claim 7, wherein the calculation of a remaining maximum permissible current value and its transmission to all other protective devices (1A-1C) takes place within the duration of one period of a current flowing in the common power line (16).

* * * * *